United States Patent
Kamimura et al.

(10) Patent No.: US 10,792,787 B2
(45) Date of Patent: Oct. 6, 2020

(54) BURNISHING MACHINE

(71) Applicant: SUGINO MACHINE LIMITED, Uozu, Toyama Prefecture (JP)

(72) Inventors: Daichi Kamimura, Uozu (JP); Masahide Ohashi, Uozu (JP); Masaru Futamura, Uozu (JP)

(73) Assignee: SUGINO MACHINE LIMITED, Uozu, Toyama Prefecture (JP)

( * ) Notice: Subject to any disclaimer, the term of this patent is extended or adjusted under 35 U.S.C. 154(b) by 22 days.

(21) Appl. No.: 16/420,952

(22) Filed: May 23, 2019

(65) Prior Publication Data

US 2020/0009704 A1    Jan. 9, 2020

(30) Foreign Application Priority Data

Jul. 4, 2018   (JP) .................................. 2018-127318

(51) Int. Cl.
  *B24B 39/04*   (2006.01)
  *B24B 39/06*   (2006.01)
  *B24B 39/00*   (2006.01)

(52) U.S. Cl.
  CPC .......... *B24B 39/045* (2013.01); *B24B 39/00* (2013.01); *B24B 39/04* (2013.01); *B24B 39/06* (2013.01); *B23B 2270/26* (2013.01); *Y10T 29/47* (2015.01); *Y10T 29/474* (2015.01); *Y10T 29/476* (2015.01); *Y10T 29/477* (2015.01)

(58) Field of Classification Search
  CPC ....... B24B 39/00; B24B 39/026; B24B 39/04; B24B 39/045; B24B 39/06; B23B 2270/26; Y10T 29/47; Y10T 29/474; Y10T 29/476; Y10T 29/477
  See application file for complete search history.

(56) References Cited

U.S. PATENT DOCUMENTS

| 2,703,920 | A | * | 3/1955 | Parker | ................... | B23B 27/007 72/42 |
| 2,966,722 | A | * | 1/1961 | Hull | ....................... | B24B 39/00 29/90.01 |
| 2,976,603 | A | * | 3/1961 | Tibbetts | ................ | B24B 39/045 29/90.01 |
| 2,977,669 | A | * | 4/1961 | Chambers | ............... | B24B 39/00 29/90.01 |

(Continued)

FOREIGN PATENT DOCUMENTS

| JP | S59-124047 U | 8/1984 | |
| JP | 2008290173 A | * 12/2008 | ............. B24B 39/04 |

*Primary Examiner* — Jermie E Cozart
(74) *Attorney, Agent, or Firm* — United IP Counselors, LLC

(57) ABSTRACT

A burnishing machine is provided in which both sides of a groove is machined by a single tool without changing the movement direction of a piston.

The burnishing machine, includes: a tip configured to press and process a process face; and a pressurizing unit configured to press the tip against the process face, the pressurizing unit including, a piston configured to reciprocate in a direction orthogonal to the tip, a cylinder portion that accommodates the piston such that the piston reciprocates; and a pressurizing mechanism configured to urge the tip to the process face at both timing of pushing the tip against the process face and pulling the tip against the process face by making the piston reciprocate.

20 Claims, 11 Drawing Sheets

(56) References Cited

U.S. PATENT DOCUMENTS

| | | | | |
|---|---|---|---|---|
| 4,434,559 | A * | 3/1984 | Lauer | G01B 5/00 33/534 |
| 5,826,453 | A * | 10/1998 | Prevey, III | B23P 9/02 72/75 |
| 2005/0155203 | A1 * | 7/2005 | Prevey | C21D 7/08 29/90.01 |
| 2005/0278922 | A1 * | 12/2005 | Jacobs | B23P 6/00 29/402.19 |
| 2006/0144198 | A1 * | 7/2006 | Okajima | B24B 39/04 82/158 |
| 2009/0178261 | A1 * | 7/2009 | Shiou | B24B 49/16 29/90.01 |
| 2012/0204390 | A1 * | 8/2012 | Prevey | B24B 39/00 29/90.01 |

\* cited by examiner

BURNISHING MACHINE

CROSS-REFERENCE TO RELATED APPLICATIONS

This application claims the benefit of priority to Japanese Patent Application No. 2018-127318, filed on Jul. 4, 2018, the entire contents of which are hereby incorporated by reference.

BACKGROUND

1. Technical Field

The present invention relates to a burnishing machine.

2. Description of the Background

Generally, a groove for fitting a seal member such as an O-ring is formed by cutting a cylindrical workpiece with an O-ring groove machining bite tip. The surface of the O-ring groove formed by the cutting process is finished by cutting. In recent years, improvement in the life of the O-ring and improvement in the sealing property have been demanded, but the surface roughness to be finished by the cutting finish is affected by the wear of the tip, and therefore, it is difficult to stabilize the surface roughness.

A burnishing is known as a technique for improving the surface roughness of a machined surface that has been machined. There is a burnishing tool for burnishing the side surface of a cut groove (for example, Japanese Utility Model Application Laid-Open No. 59-124047, hereinafter referred to as "Patent Literature 1") as a tool for improving the sealing property by finishing the surface roughness of the cut groove satisfactorily.

The burnishing tool described in Patent Literature 1 has a burnisher having a rear holder for holding a cemented carbide burnishing tool, and a piston to which the burnisher is attached. The piston is provided so as to be retractable from the holder, and is biased to project by a spring provided in the holder. The cemented carbide burnishing tool is urged together with the burnisher, and is pressed against the side surface of the cylindrical outer circumferential groove of the rotating workpiece to perform the burnishing process.

BRIEF SUMMARY

In the burnishing tool of Patent Literature 1, the cemented carbide burnishing tool is urged only in the pushing direction with respect to the holder. Therefore, in order to process both side surfaces of the cylindrical outer circumferential groove, the movement direction of the piston must be changed. Alternatively, it is necessary to separately provide a piston which can be urged in the pulling direction with respect to the holder.

It is an object of the present invention to provide a burnishing machine capable of machining both sides of a groove by a single tool without changing the movement direction of a piston.

One or more aspects of the present invention provides a burnishing machine, including:
  a tip configured to press and process a process face; and
  a pressurizing unit configured to press the tip against the process face, the pressurizing unit including,
    a piston configured to reciprocate in a direction orthogonal to the tip,
    a cylinder portion that accommodates the piston such that the piston reciprocates; and
    a pressurizing mechanism configured to urge the tip to the process face at both timing of pushing the tip against the process face and pulling the tip against the process face by making the piston reciprocate.

According to the present invention, both sides of the groove are burnished by a single tool without changing the movement direction of the piston.

DETAILED DESCRIPTION

Figure 4:
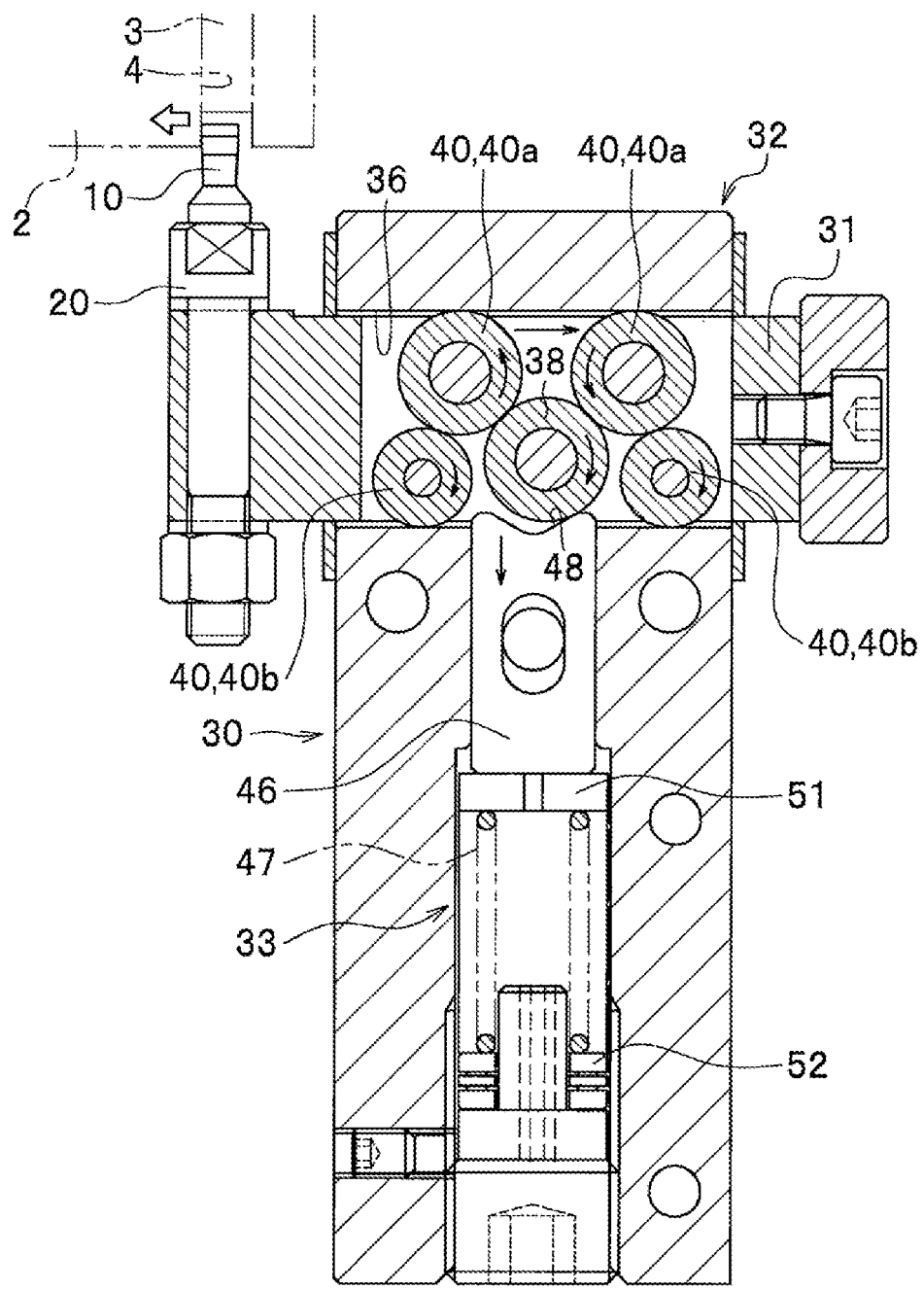
FIG. 4 is a cross-sectional view showing a state in which the piston according to the first embodiment is moved during the pressing process.

The detailed description of the invention according to embodiments will be given with reference to the drawings. The burnishing machine burnishes any of the outer surface, the inner surface, and the end surface of the workpiece as a surface to be processed. In the present embodiment, as shown in FIG. 4, the case where the burnishing machine 1 processes the O-ring mounting groove 3 on the outer peripheral surface of the workpiece 2 will be described as an example. In addition, when the workpiece 2 is processed by the burnishing machine 1 of the present embodiment, the workpiece 2 may be rotated by using the center pusher 5.

First Embodiment

Figure 1:
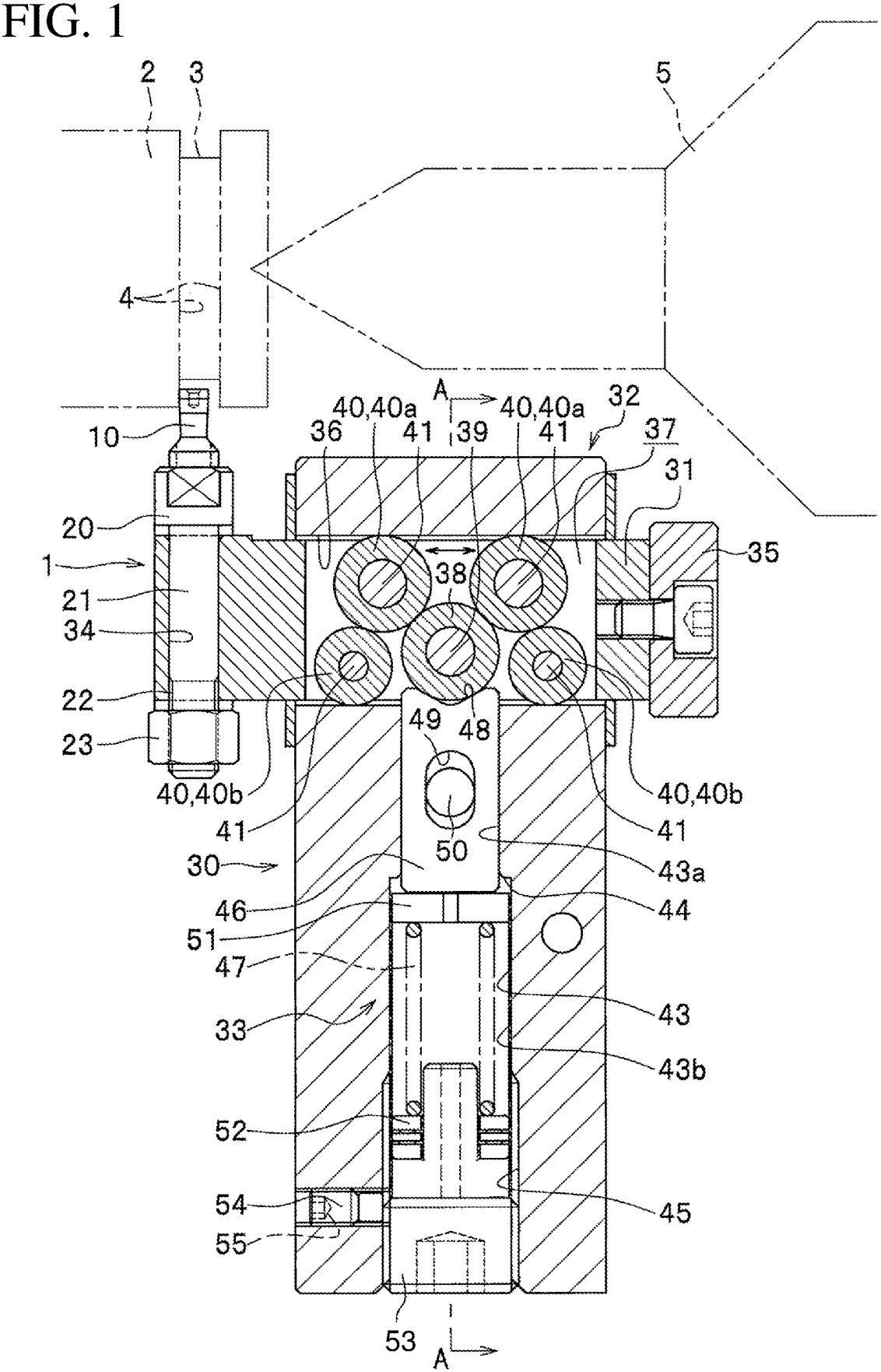
FIG. 1 is a cross-sectional view of the burnishing machine according to a first embodiment.

As shown in FIG. 1, the burnishing machine 1 of the present embodiment includes a tip 10, a tip holder 20, and a pressurizing unit 30.

Figure 3:
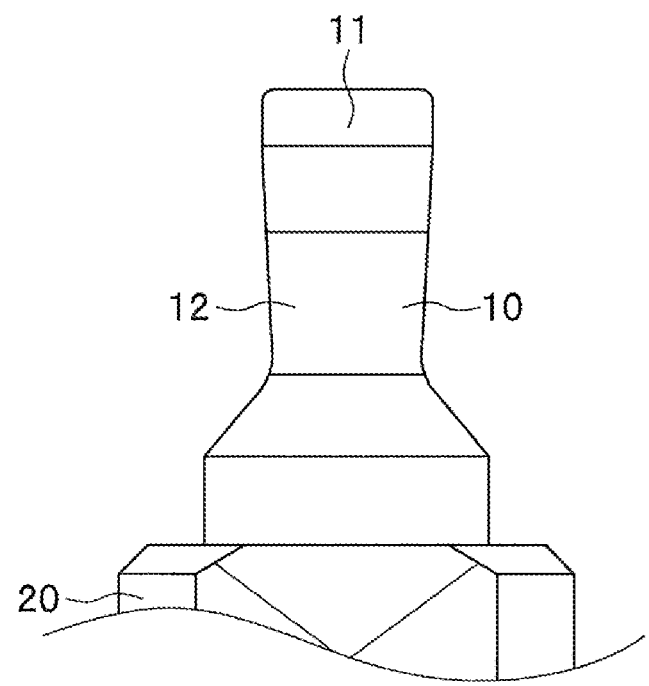
FIG. 3 is an enlarged side view of the tip according to the first embodiment.

The tip 10 machines the surface to be machined of the workpiece 2, such as both side surfaces 4 of the O-ring mounting groove 3 by pressing. The tip 10 is in the shape of a thin round bar, and has a size such that its distal end can be inserted into the O-ring mounting groove 3. As also shown in FIG. 3, the tip 10 has a parallel portion 11 and a tapered portion 12. The parallel portion 11 is formed at the distal end portion of the tip 10, and the outer peripheral surface thereof is parallel to the process face (side surface 4). Since the length of the parallel portion 11 in the axial direction of the tip 10 is short, the contact area between the tip 10 and the workpiece 2 is small. As a result, the workpiece 2 is processed with a relatively small pressing load of the tip 10. The tapered portion 12 is located on the base end side of the parallel portion 11 and decreases in diameter toward the base end side. The tapered portion 12 relieves the load acting on the workpiece 2. After the parallel portion 11 of the tip 10 inserted into the O-ring mounting groove 3 comes into contact with the surface to be processed, as the tapered portion 12 comes into contact with the surface to be processed, the pressure is gradually reduced and rubbing due to the difference in peripheral speed occurs, whereby a good finished surface is obtained. The shape of the tip 10 is not limited, and may be a shape having no tapered portion and only parallel portions.

The tip 10 is made of a ultra-high hardness material such as diamond or cemented carbide. The material of the tip 10 may be determined according to the material of the workpiece 2 or the state of the processed portion. Therefore, the tip 10 is not limited to an ultra-high hardness material, and may be formed of a general steel material. By performing surface treatment or surface processing on the tip 10, the frictional resistance between the tip 10 and the workpiece 2 can be changed, and the durability of the tip 10 can be improved.

As shown in FIG. 1, the tip holder 20 supports the tip 10. The tip holder 20 has a body portion 21 which is thinner than the upper end portion. The tip holder 20 has a threaded portion 22 on the outer peripheral surface of the lower end portion, that is, the end portion on the opposite side to the tip 10.

The tip holder may rotatably support the tip. In this case, the tip holder 20 has a ball bearing for rotating the tip 10.

The pressurizing unit 30 presses the tip 10 against the process face, i.e., the side surface 4. The pressurizing unit 30 includes a piston 31, a cylinder portion 32, and a pressurizing mechanism 33.

The piston 31 holds the tip holder 20. The axial direction of the piston 31 is perpendicular to the axial direction of the tip 10. The axial direction of the tip 10 extends in the vertical direction in FIG. 1. The axial direction of the piston extends in the left-right direction in FIG. 1. The piston 31 has a rectangular cross-sectional shape, see FIG. 2. The piston 31 reciprocates in the left-right direction in FIG. 1. A support hole 34 through which the tip holder 20 is inserted passes through the tip end portion of the piston 31 in the vertical direction. The body portion 21 of the tip holder 20 is inserted into the support hole 34. The tip holder 20 is fixed to the piston 31 by screwing the nut 23 to the threaded portion 22 of the body portion 21. A flange portion 35 is removably bolted to the proximal end of the piston 31, that is, the end portion on the opposite side to the tip 10. The flange portion 35 serves as a stopper for preventing the piston 31 from falling out of the through hole 36 of the cylinder portion 32.

Figure 2:
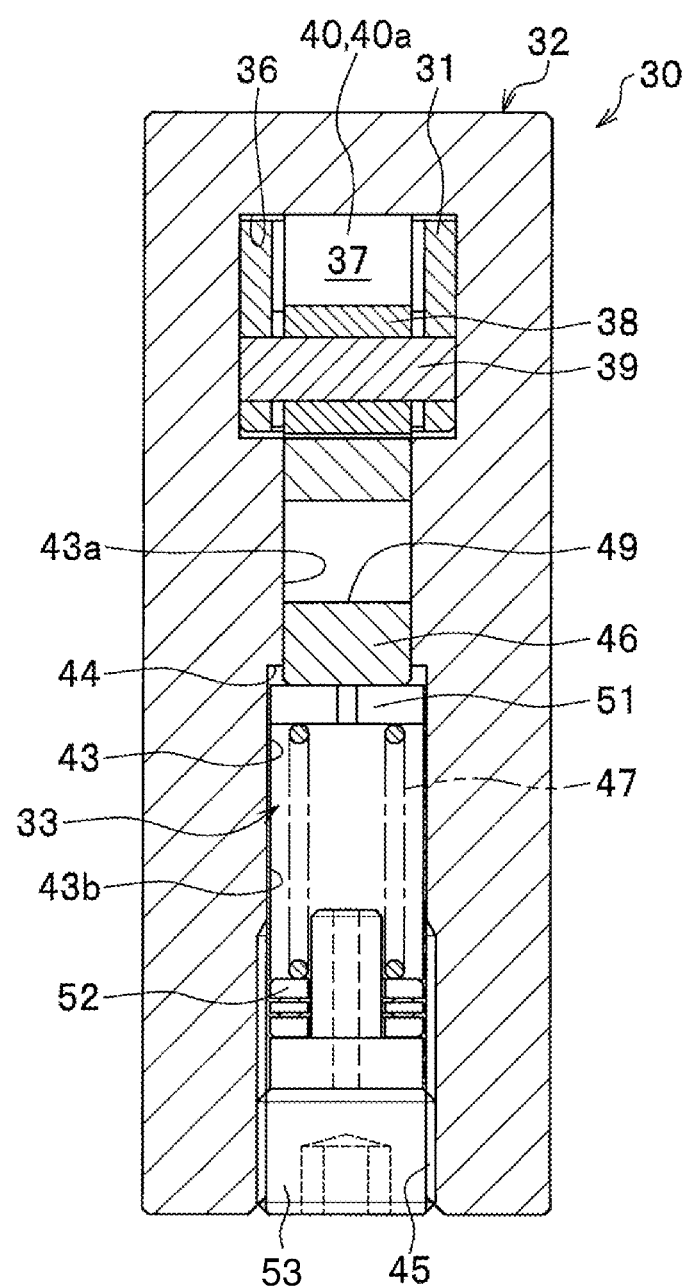
FIG. 2 is a cross-sectional view taken along line A-A of FIG. 1.

As also shown in FIG. 2, a cavity 37 penetrating vertically is formed in an intermediate portion of the piston 31. The cavity 37 is provided with a cylindrical rolling element 38. The rolling element 38 is rotatable about an axis orthogonal to the axial direction of the piston 31, which extends in the front-back direction of the drawing in FIG. 1 and in the left-right direction in FIG. 2. The axis of the rolling element 38 of the present embodiment is a cylindrical body 39 spanned between the side walls of the cavity 37. The rolling element 38 is located in the middle portion of the cavity 37 in the axial direction, and is arranged such that the lower end of the rolling element 38 is flush with the lower end of the piston 31.

In the present embodiment, in order to suppress rolling and yawing of the piston 31, a pressurizing mechanism for applying a pressurizing pressure to the piston 31 is provided. The piston 31 slides along the axial direction by the pressurizing mechanism. Therefore, the inclination of the tip 10 is suppressed, and the accuracy of the burnishing process is increased. The pressurizing mechanism of the present embodiment includes a plurality of auxiliary rolling elements 40 provided around the rolling elements 38. The auxiliary rolling element 40 has a cylindrical shape and is arranged in parallel with the rolling element 38. The auxiliary rolling element 40 is rotatable about a cylindrical body 41 bridged between the side walls of the cavity 37. The auxiliary rolling element 40 has an upper rolling element 40a disposed on both left and right obliquely upper sides of the rolling element 38, and a lower rolling element 40b disposed on both left and right sides of the rolling element 38. An oblique lower portion of the upper rolling element 40a contacts an oblique upper portion of the rolling element 38. The upper end portion of the upper rolling element 40a slightly protrudes upward from the upper end of the piston 31, and when the piston 31 is inserted into the through hole 36, the upper end portion of the upper rolling element 40a is urged to the upper surface of the through hole 36 of the cylinder portion 32.

The lower rolling element 40b is disposed on the side of the rolling element 38 so as not to contact the rolling element 38 with a gap therebetween. The obliquely upper portion of the lower rolling element 40b contacts the obliquely lower portion of the upper rolling element 40a. The lower end portion of the lower rolling element 40b slightly protrudes downward from the lower end of the piston 31, and when the piston 31 is inserted into the through hole 36, the lower end portion of the lower rolling element 40b is urged to the lower surface of the through hole 36 of the cylinder portion 32.

As described above, since the upper rolling element 40a and the lower rolling element 40b roll on the surface of the through hole 36 while applying a pressure to the through hole 36, respectively, the piston 31 can slide along the axial direction of the through hole 36.

The shapes of the piston and the cylinder portion are not particularly limited. The piston may have a rectangular cross section, and a plurality of rolling elements may be provided on the inner surface of the through hole of the cylinder portion, and the rolling elements may support the piston so as to surround the piston. In this case, the piston is pressurized by a plurality of rolling elements.

The cylinder portion 32 accommodates the piston 31 so that the piston 31 can move in the axial direction. The cylinder portion 32 has a cylindrical shape surrounding the periphery of the piston 31, and has a through hole 36. The through hole 36 has a rectangular cross-sectional shape slightly larger than the outer shape of the piston 31, and has a clearance for allowing the piston 31 to move in the axial direction. Since the pair of lower rolling elements 40b are in contact with the lower surface of the through hole 36 and the pair of upper rolling elements 40a are in contact with the upper surface of the through hole 36, the piston 31 moves without tilting the axis of the piston 31 and the axis of the through hole 36. The lower side of the cylinder portion 32 extends downward, and a second through hole 43 in which a pusher 46 and a spring member 47 of the pressurizing mechanism 33, which will be described later, are accommodated, is formed. The second through hole 43 penetrates from the lower surface of the axial middle portion of the through hole 36 to the lower end portion of the cylinder portion 32. The second through hole 43 has a circular cross section. The second through hole 43 has a step portion 44 on its inner peripheral surface, and a lower portion of the second through hole 43 has a larger diameter than an upper portion of the second through hole 43. The upper side of the step portion 44 is the small diameter portion 43a, and the lower side is the large diameter portion 43b. The large diameter portion 43b has a female screw portion 45 on the inner peripheral surface of the lower end portion.

The pressurizing mechanism 33 urges the tip 10 to the process face (side surface 4) at both the time of pushing and pulling. At the time of pushing, the pressurizing mechanism 33 pushes the tip 10 against the back side surface of the surface to be processed, that is, the left side in FIG. 1. At the time of pulling, the pressurizing mechanism 33 pulls the tip 10 toward the front side surface of the surface to be processed (right side in FIG. 1). Specifically, the pressurizing mechanism 33 includes a rolling element 38, a pusher 46, and a spring member (elastic member) 47. As described above, the rolling element 38 is provided in the piston 31.

The pusher 46 presses the rolling element 38 from the lower side toward the upper side. The pusher 46 has a cylindrical shape and is movable in a direction perpendicular to the axial direction of the piston 31 and the axial direction of the rolling element 38. The pusher 46 is inserted into the small diameter portion 43a of the second through hole 43 provided in the lower portion of the cylinder portion 32 so as to be able to move up and down. The pusher 46 has a cam surface 48 which engages with the outer circumferential surface of the rolling element 38, and has the function of a linear cam. The piston 31 serves as a source and the pusher 46 serves as a follower. The rolling elements 38 function as cam followers. The cam surface 48 is formed at the upper end portion of the pusher 46 and has a lower center and increases toward both ends in the reciprocating direction of the piston 31. The cam surface 48 abuts the rolling element 38. When the piston 31 is at the reference position, the height of the cam surface 48 with respect to the rolling element 38 reaches the maximum point, and the height of the cam surface 48 with respect to the rolling element 38 gradually decreases as the piston 31 reciprocates. The cam surface 48 may have a flat portion at the center.

The pusher 46 is formed with an elongated hole 49 that is long in the axial direction. A cylindrical guide rod 50 is inserted into the elongated hole 49. The guide rod 50 is fixed to the wall surface of the second through hole 43. The elongated hole 49 guides the moving direction of the pusher 46. The guide rod 50 prevents rotation of the pusher 46 about its axis. The upper end portion of the pusher 46 protrudes upward from the upper end of the second through hole 43, and the cam surface 48 abuts the lower end portion of the rolling element 38. The lower end portion of the pusher 46 is disposed so as to project downward from the step portion 44 of the second through hole 43.

The spring member 47 urges the pusher 46 toward the rolling element 38. The spring member 47 is a spring, and is accommodated in the large diameter portion 43b of the second through hole 43. A ring-shaped spring receiving member 51 abuts the upper end portion of the spring member 47. The outer diameter of the spring receiving member 51 is slightly smaller than the inner diameter of the large diameter portion 43b. The spring receiving member 51 is disposed in the vicinity of the step portion 44. The pusher 46 is placed on the spring receiving member 51. A ring-shaped pedestal 52 abuts the lower end portion of the spring member 47. The pedestal 52 is a thrust ball bearing and can absorb the twist of the spring member 47.

A load adjusting screw 53 for adjusting the spring load of the spring member 47 is provided on the lower side of the pedestal 52. The load adjusting screw 53 is screwed into the female screw portion 45 at the lower end portion of the second through hole 43, and moves up and down by rotating. When the load adjusting screw 53 is raised, the pedestal 52 is raised, and the height dimension of the spring member 47 is reduced. This increases the spring load on the pusher 46. When the load adjusting screw 53 is lowered, the pedestal 52 is lowered, and the height dimension of the spring member 47 is increased. As a result, the spring load applied to the pusher 46 is reduced. The spring load is appropriately set in accordance with the materials and shapes of the workpiece 2 and the tip 10, the surface roughness of the surface to be processed, and the like. A fixing screw 54 and a screw hole 55 for fixing the load adjusting screw 53 in a predetermined position are provided on a side portion of the load adjusting screw 53.

In the pressurizing unit 30 of the present embodiment, when the piston 31 moves in the reciprocating direction, the rolling element 38 is pressed against the inclined surface of the cam surface 48 of the pusher 46. Then, the pusher 46 moves downward, and the spring member 47 is compressed. At this time, the restoring force of the spring member 47 becomes a reaction force, and the pusher 46 is pushed back. A component of a force applied upward from the pusher 46 to the cam surface 48 is applied in the reciprocating direction of the piston 31. The urging force of the pusher 46 on the rolling element 38, i.e., the reaction force of the spring member 47, is proportional to the compression dimension. That is, as the amount of displacement of the piston 31 from the reference position increases, the urging force of the pusher 46 to the rolling element 38 increases.

If the cam surface 48 is planar, the urging force of the pusher 46 on the rolling element 38 is proportional to the amount of displacement of the piston 31 from the reference position. Even if the cam surface 48 is curved, a force in the reciprocating direction of the piston 31 is applied according to the cross-sectional function of the cam surface 48. Therefore, a force corresponding to the position of the piston 31 acts on the tip 10. That is, the stress applied to the surface to be processed by the tip 10 can be controlled in accordance with the amount of displacement of the piston 31 from the reference position.

Next, the operation and effect of the present embodiment will be described while explaining the operation of each part when the burnishing processing is performed using the burnishing machine 1.

Pushing

At the time of pushing, as shown in FIG. 4, while rotating the workpiece 2, the tip 10 is pressed against the back side surface of the process face, i.e., the left side surface 4 of the O-ring mounting groove 3 in FIG. 4. At this time, the tip 10 receives a reaction force, and the piston 31 moves rightward relative to the cylinder portion 32 together with the tip 10 and the tip holder 20. Then, since the rolling element 38 moves rightward with respect to the pusher 46, the rolling element 38 pushes the right slope of the cam surface 48, and the pusher 46 is pushed downward. As a result, the spring member 47 is compressed, and a spring force (elastic force) is generated. This elastic force is transmitted to the tip 10 via the pusher 46, the rolling element 38, the piston 31, and the tip holder 20. The stress applied to the surface to be processed by the tip 10 changes in accordance with the amount of displacement of the piston 31 from the reference position. In this way, a suitable pressure is applied to the process face (side surface 4) of the workpiece 2, and the burnishing process can be performed to the desired surface roughness.

Pulling

Figure 5:
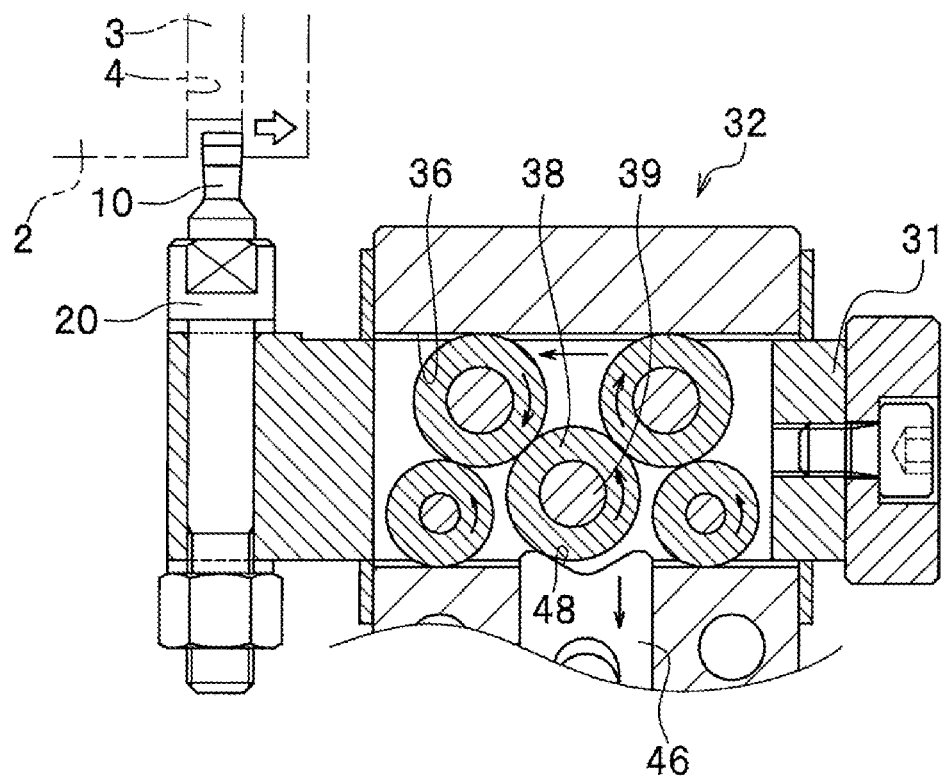
FIG. 5 is a cross-sectional view showing a state in which the piston according to the first embodiment is moved during pulling process.

At the time of pulling, as shown in FIG. 5, while rotating the workpiece 2, the tip 10 is pulled to the front side surface of the process face (the right side surface 4 of the O-ring mounting groove 3 in FIG. 5). At this time, the tip 10 receives a reaction force, and the piston 31 moves leftward relative to the cylinder portion 32 together with the tip 10 and the tip holder 20. Then, since the rolling element 38 moves leftward with respect to the pusher 46, the rolling element 38 pushes the left slope of the cam surface 48, and the pusher 46 is pushed downward. As a result, the spring member 47 is compressed, and an elastic force is generated. This elastic force is transmitted to the tip 10 via the pusher 46, the rolling element 38, the piston 31, and the tip holder 20. In this way, a suitable pressure is applied to the process face (side surface 4) of the workpiece 2, and the burnishing process can be performed to the desired surface roughness.

As described above, according to the burnishing machine 1 of the present embodiment, the piston 31 can move in both directions in the axial direction of the cylinder portion 32, and the pressurizing mechanism 33 can transmit the elastic force of the spring member 47 in both directions of the piston 31. Therefore, the tip 10 can be urged to the surface to be processed both at the time of pushing and pulling. Therefore, regardless of the pressing direction of the tip 10, the two side surfaces 4 of the O-ring mounting groove 3 can be burnished by a single tool without changing the movement direction of the piston 31.

In addition, since the tip 10 of the present embodiment has the parallel portion 11 having a short axial length, the workpiece 2 can be processed with a relatively small pressing load of the tip 10. Further, since the tip 10 has the tapered portion 12, when the tip 10 is pushed or pulled, the pressure is gradually reduced and rubbing due to a difference in peripheral speed occurs, thereby obtaining a good finished surface.

The pressurizing mechanism 33 of the present embodiment includes a rolling element 38, a pusher 46, and a spring member 47, and the pusher 46 and the spring member 47 are arranged to extend below the piston 31. That is, the pressurizing mechanism 33 is pressurized in a direction perpendicular to the axial direction of the piston 31. Therefore, since the axial length of the piston 31 can be reduced, the space behind the piston 31 is widened. As a result, it is possible to secure a space for installing the center pusher 5 for rotating the workpiece 2.

Further, since the pressurizing mechanism 33 of the present embodiment has the load adjusting screw 53 which is a spring load adjusting member, the spring load of the spring member 47 can be adjusted to a desired magnitude. As a result, the force for pressing the surface to be processed by the tip 10 can be appropriately adjusted to a stable magnitude, so that a uniform finished surface can be obtained.

Figure 6:
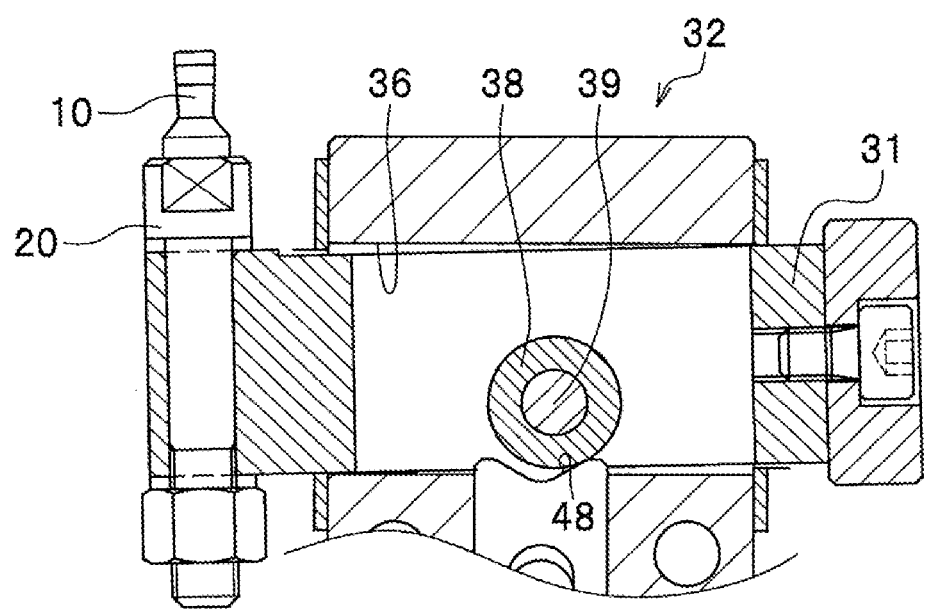
FIG. 6 is a cross-sectional view of a comparative example of the burnishing machine according to the first embodiment.

In the present embodiment, inclination of the piston 31 can be suppressed by a plurality of auxiliary rolling elements 40 provided around the rolling elements 38. If the auxiliary rolling element 40 is not provided, as shown in FIG. 6, the pusher 46 pushes the rolling element 38 upward, so that the piston 31 is also lifted by the clearance with the through hole 36 of the cylinder portion 32 and inclined. However, in the present embodiment, as shown in FIG. 4 and FIG. 5, since the upper rolling element 40a abuts against the upper surface of the through hole 36 and the lower rolling element 40b abuts against the lower surface of the through hole 36, it is possible to prevent the piston 31 from tilting. Further, since the auxiliary rolling element 40 makes rolling contact with the inner peripheral surface of the through hole 36, the piston 31 can smoothly move with respect to the cylinder portion 32.

Modification of First Embodiment

Figure 7:
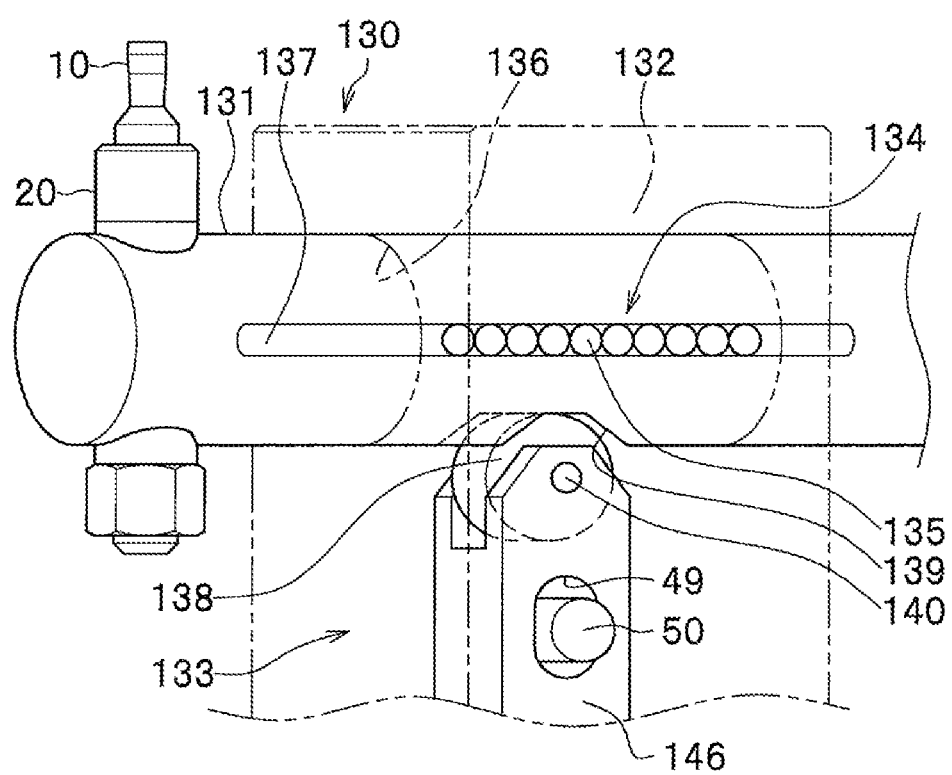
FIG. 7 is a perspective view of a burnishing machine according to a modification of the first embodiment.
Figure 8:
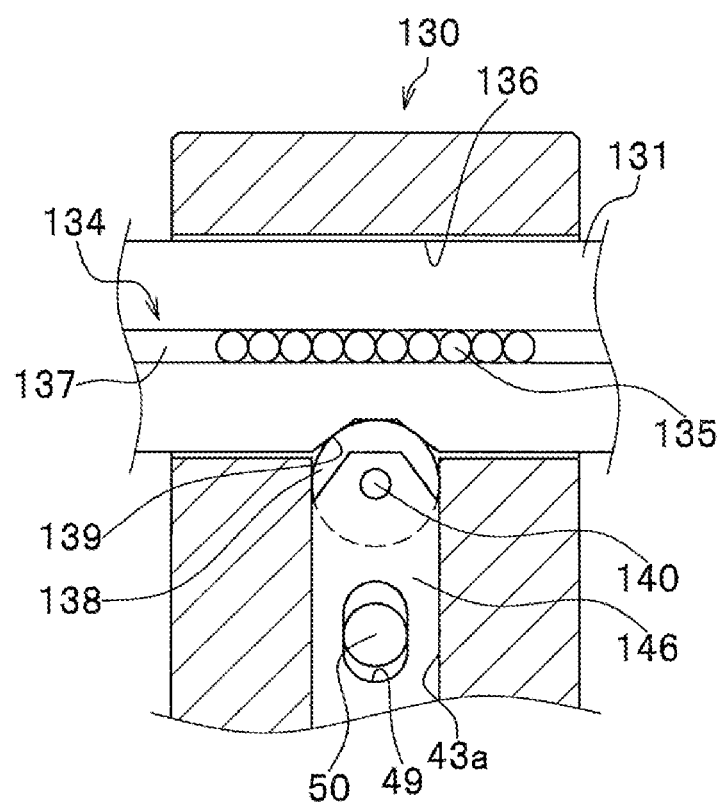
FIG. 8 is a cross-sectional view of a main part of a burnishing machine according to the modification of the first embodiment.

Next, a burnishing machine according to a modification of the first embodiment will be described. As shown in FIGS. 7 and 8, the burnishing machine of the present modification differs from the first embodiment in the configuration of the pressurizing unit 130. The pressurizing unit 130 of the present modification includes a piston 131, a cylinder portion 132, and a pressurizing mechanism 133. The piston 131 is movably supported by the cylinder portion 132 via a ball spline 134 serving as a pressurizing mechanism. Specifically, the cylinder portion 132 has a through hole 136 through which the piston 131 is inserted. A ball row 135 composed of a plurality of balls is arranged in the cylinder portion 132 so as to be able to circulate. The ball row 135 is disposed along the axial direction of the piston 131, and a part thereof protrudes inside the through hole 136. The ball rows 135 are provided on both sides of the through hole 136 so as to sandwich the piston 131. A guide groove 137 is formed in the outer circumferential surface of the piston 131 along the axial direction. The guide groove 137 has an arc-shaped cross-sectional shape and is formed in a reciprocating movement range of the piston 131. A part of the cross section of the ball row 135 is inserted into the guide groove 137. The ball row 135 rolls while pressing the guide groove 137 in the radial direction of the piston 131, and circulates in the cylinder portion 132. The ball row 135 may be provided separately for the purpose of slidability and suppression of inclination of the piston.

A cam surface 139 is formed on the outer peripheral surface of the piston 131 to engage with the outer peripheral surface of the rolling element 138 described later. The cam surface 139 has a concave groove shape and extends in the direction of the axis 140. The cam surface 139 has a horizontal portion at a central portion thereof and inclined portions at both ends thereof. The inclined portion becomes lower toward the outside in the reciprocating direction of the piston 131. The cam surface 139 abuts the rolling element 138 and reaches a minimum height relative to the rolling element 138 when the piston 131 is in the reference position. Further, as the piston 131 reciprocates, the pusher 146 and the rolling element 138 are lowered, so that the height of the cam surface 139 with respect to the rolling element 138 is gradually increased.

The pressurizing mechanism 133 includes a pusher 146, a spring member (not shown) as an elastic member, and a rolling element 138. The pusher 146 presses the piston 131 from the lower side toward the upper side. The pusher 146 has a cylindrical shape and is movable in a direction orthogonal to the axial direction of the piston 131, that is, in the vertical direction of FIGS. 7 and 8. The pusher 146 is inserted into the small diameter portion 43a of the second through hole 43 provided in the lower portion of the cylinder portion 132 so as to be able to move up and down. A rolling element 138 is rotatably supported at an upper end portion of the pusher 46.

The rolling element 138 has a cylindrical shape, and is provided at the distal end portion of the pusher 146 so as to be rotatable about an axis 140 perpendicular to the axial direction of the piston 131 and the axial direction of the pusher 146. The upper end portion of the rolling element 138 enters the cam surface 139 of the piston 131, and abuts the piston 131 from the lower side.

The spring member urges the pusher 146 toward the piston 131. Since the spring member of the present modification has the same configuration as that of the first embodiment, illustration and description thereof are omitted. Since the other configurations are the same as those of the first embodiment, the illustrated portions are denoted by the same reference numerals and descriptions thereof are omitted.

When the pushing process is performed by using the burnishing machine of the present modification, the piston 131 moves rightward relative to the cylinder portion 132 together with the tip 10 and the tip holder 20. Then, since the cam surface 139 moves rightward with respect to the rolling element 138, the left slope of the cam surface 139 pushes the rolling element 138, and the rolling element 138 and the pusher 146 are pushed downward. As a result, the spring member is compressed, and an elastic force is generated. This elastic force is transmitted to the tip 10 via the pusher 146, the rolling element 138, the piston 131, and the tip holder 20.

On the other hand, when the pulling process is performed, the piston 131 moves leftward relative to the cylinder portion 132 together with the tip 10 and the tip holder 20. Then, since the cam surface 139 moves leftward with respect to the rolling element 138, the right slope of the cam surface 139 pushes the rolling element 138, and the rolling element 138 and the pusher 146 are pushed downward. As a result, the spring member is compressed, and an elastic force is generated. This elastic force is transmitted to the tip 10 via the pusher 146, the rolling element 138, the piston 131, and the tip holder 20.

According to the present modification, even single rolling element 138 prevents the inclination of the piston 131 relative to the cylinder portion 132 and moves through the through hole 136. The pressurizing mechanism is not limited to the ball spline 134, and may have other shapes. For example, a linear guide in which a convex portion is inserted into a linear guide groove may be used.

Second Embodiment

Figure 9:
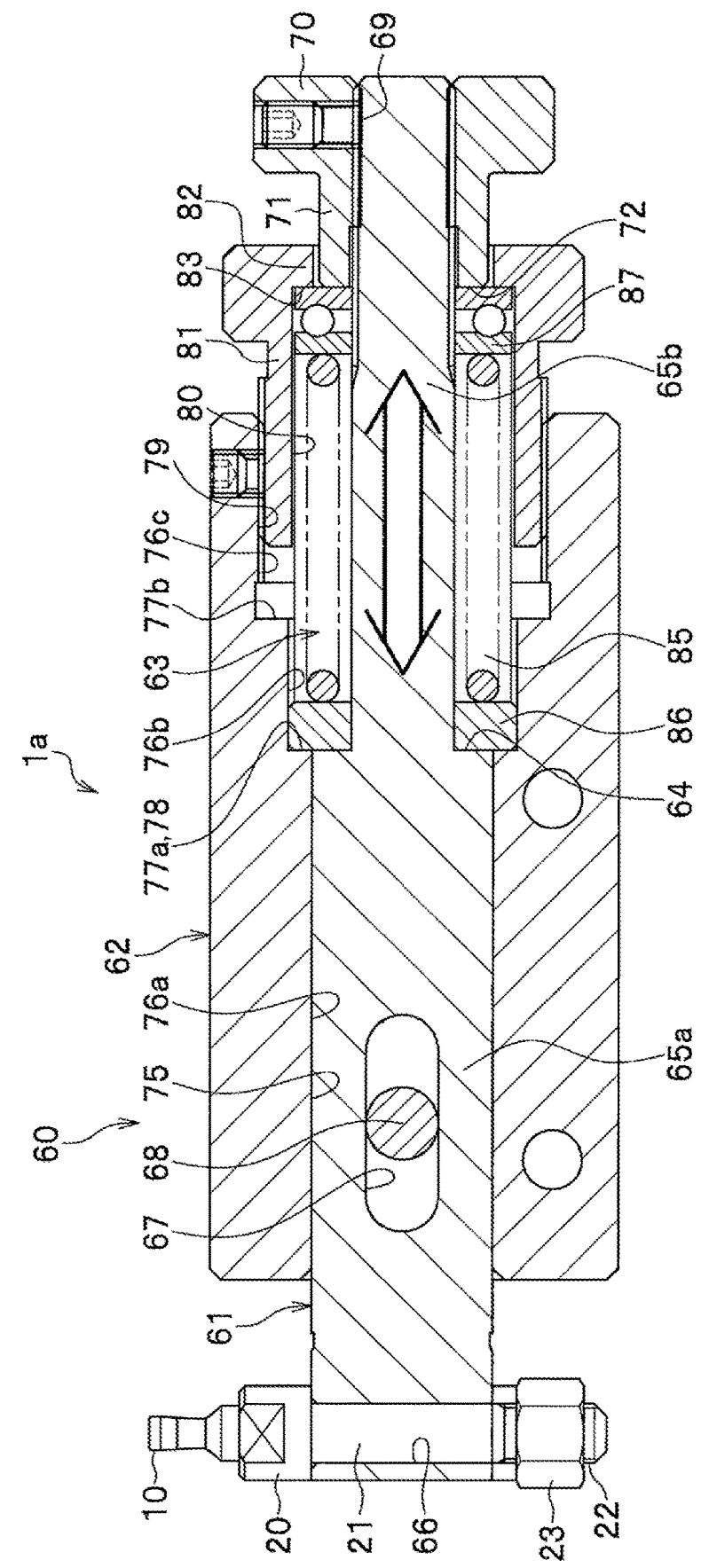
FIG. 9 is a cross-sectional view of the burnishing machine of a second embodiment.

Next, the burnishing machine 1a of the second embodiment will be described. As shown in FIG. 9, the burnishing machine 1a of the second embodiment includes a tip 10, a tip holder 20, and a pressurizing unit 60. Since the configuration of the pressurizing unit 60 differs from that of the burnishing machine 1 of the first embodiment in the burnishing machine 1a of the present embodiment, the pressurizing unit 60 will be mainly described. The configurations of the tip 10 and the tip holder 20 of the present embodiment are the same as those of the first embodiment, and therefore, the same reference numerals are assigned to them, and descriptions thereof are omitted.

The pressurizing unit 60 includes a piston 61, a cylinder portion 62, and a pressurizing mechanism 63. The piston 61 holds the tip holder 20 and has an axial direction orthogonal to the axial direction of the tip 10. The piston 61 has a circular cross-sectional shape, and has a stepped cylindrical shape in which the distal end side (tip side end) has a larger diameter than the proximal end side (side opposite to the tip side). The piston 61 has a step portion at an axial intermediate portion. The distal end side (left side in FIG. 9) of the step portion is the large diameter portion 65a, and the proximal end side (right side in FIG. 9) of the step portion is the small diameter portion 65b. The step portion constitutes a first pressing surface 64 that abuts against one end portion (distal end portion) of an elastic member 85 described later via a first receiving member 86.

A support hole 66 through which the tip holder 20 is inserted penetrates the distal end portion of the piston 61 in the vertical direction. The tip holder 20 inserted into the support hole 66 is fixed to the piston 61 by the nut 23. A elongated hole 67 that is long in the axial direction is formed in the large diameter portion 65a. A cylindrical guide rod 68 is inserted into the elongated hole 67. The guide rod 68 is fixed to a wall surface of a through hole 75 described later. The elongated hole 67 guides the moving direction of the piston 61. The guide rod 68 prevents rotation of the piston 61 about its axis.

The piston 61 has a male screw portion 69 on the outer peripheral surface of the proximal end portion. A nut member 71 having a flange portion 70 is screwed to the male screw portion 69. The nut member 71 is rotated to move in the axial direction of the piston 61. The distal end surface of the nut member 71 constitutes a second pressing surface 72 that abuts against the other end portion (proximal end surface) of the elastic member 85 (described later) via a second receiving member 87.

The cylinder portion 62 accommodates the piston 61 so that the piston 61 can move in the axial direction. The cylinder portion 62 has a cylindrical shape surrounding the periphery of the piston 61, and has a through hole 75. A piston accommodating portion 76a for accommodating the piston 61 so as to be movable in the axial direction is formed on the distal end side of the through hole 75. The piston accommodating portion 76a has an inner diameter slightly larger than the outer diameter of the piston 61. A first large diameter portion 76b having an enlarged diameter is formed on the proximal end side of the piston accommodating portion 76a via a first step portion 77a. The first step portion 77a constitutes a first support surface 78 that abuts against one end portion (distal end portion) of an elastic member 85 (described later) via a first receiving member 86. When the piston 61 is at the reference position with respect to the cylinder portion 62, the first support surface 78 is flush with the first pressing surface 64. A second large diameter portion 76c having a diameter further increased is formed on the proximal end side of the first large diameter portion 76b via a second step portion 77b. The second large diameter portion 76c has an female screw portion 79 on its inner peripheral surface.

A screw member 81 having a through hole 80 is screwed to the female screw portion 79. The screw member 81 is rotated to move in the axial direction of the cylinder portion 62. The inner diameter of the through hole 80 is equal to the inner diameter of the first large diameter portion 76b. A projecting portion 82 protruding toward the center side is formed at the base end peripheral edge portion of the through hole 80. The projecting portion 82 has a ring shape and an inner diameter into which the nut member 71 can be inserted. The distal end surface of the projecting portion 82 constitutes a second support surface 83 that abuts against the other end portion, i.e., the proximal end surface, of the elastic member 85, which will be described later, via the second receiving member 87. When the piston 61 is at the reference position with respect to the cylinder portion 62, the second support surface 83 is flush with the second pressing surface 72.

The pressurizing mechanism 63 urges the tip 10 to the process face (side surface 4) at both the time of pushing and pulling. The pressurizing mechanism 33 includes an elastic member 85 provided along the axial direction of the piston 61.

The elastic member 85 is a compression helical spring and is disposed so as to surround the small diameter portion 65b of the piston 61. A first receiving member 86 is attached to one end (distal end) of the elastic member 85, and a second receiving member 87 is attached to the other end (proximal end). The elastic member 85, the first receiving member 86, and the second receiving member 87 are accommodated in a space surrounded by the small diameter portion 65b of the piston 61, the first large diameter portion 76b of the cylinder portion 62, and the through hole 80 of the screw member 81.

The first receiving member 86 has a ring shape. The inner peripheral side of the distal end surface of the first receiving member 86 abuts against the first pressing surface 64, and the outer peripheral side abuts against the first support surface 78. The second receiving member 87 is a ring-shaped slide ball bearing and can absorb the twist of the elastic member 85. The inner peripheral side of the proximal end side end surface of the second receiving member 87 abuts against the second pressing surface 72, and the outer peripheral side abuts against the second support surface 83.

Figure 10:
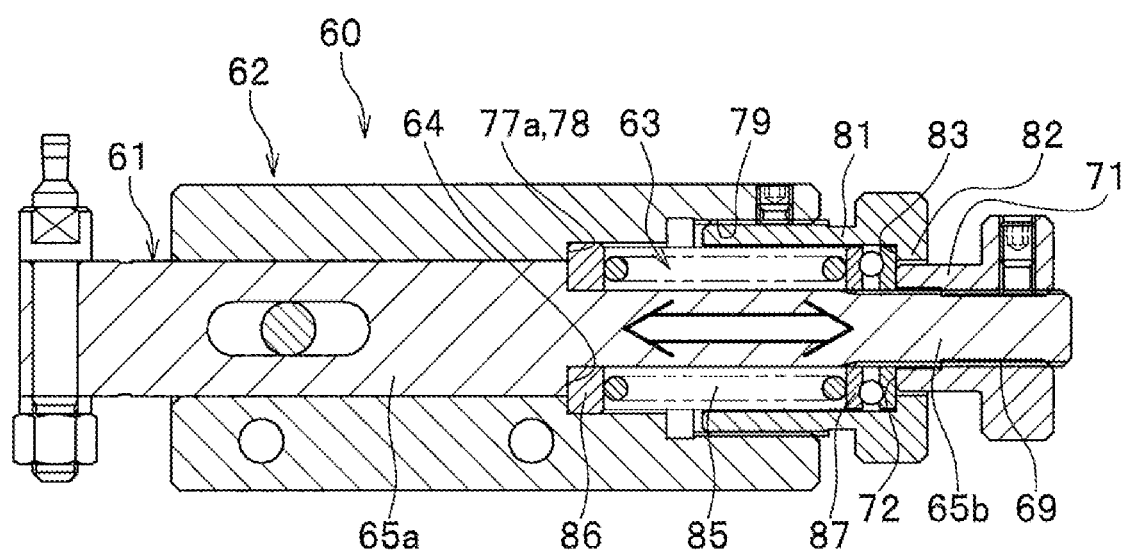
FIG. 10 is a cross-sectional view showing a state in which the spring load of the burnishing machine of the second embodiment is adjusted.

The screw member 81 has a function of a load adjusting member that moves the second receiving member 87 attached to the proximal end side of the elastic member 85 in the axial direction. As shown in FIG. 10, when the screw member 81 is rotated and moved to the distal end side, the second receiving member 87 moves to the distal end side, and the axial length of the elastic member 85 decreases. As a result, the spring load applied to the piston 61 increases. At this time, the nut member 71 is also rotated so that the second pressing surface 72 is moved toward the distal end so that it is in contact with the second receiving member 87. On the other hand, when the screw member 81 is moved to the proximal end side, the axial length of the elastic member 85 increases, and the spring load applied to the piston 61 decreases.

Next, the operation and effects of the present embodiment will be described while explaining the operation of each part when the burnishing process is performed using the burnishing machine 1a of the present embodiment.

Pushing

Figure 11A:
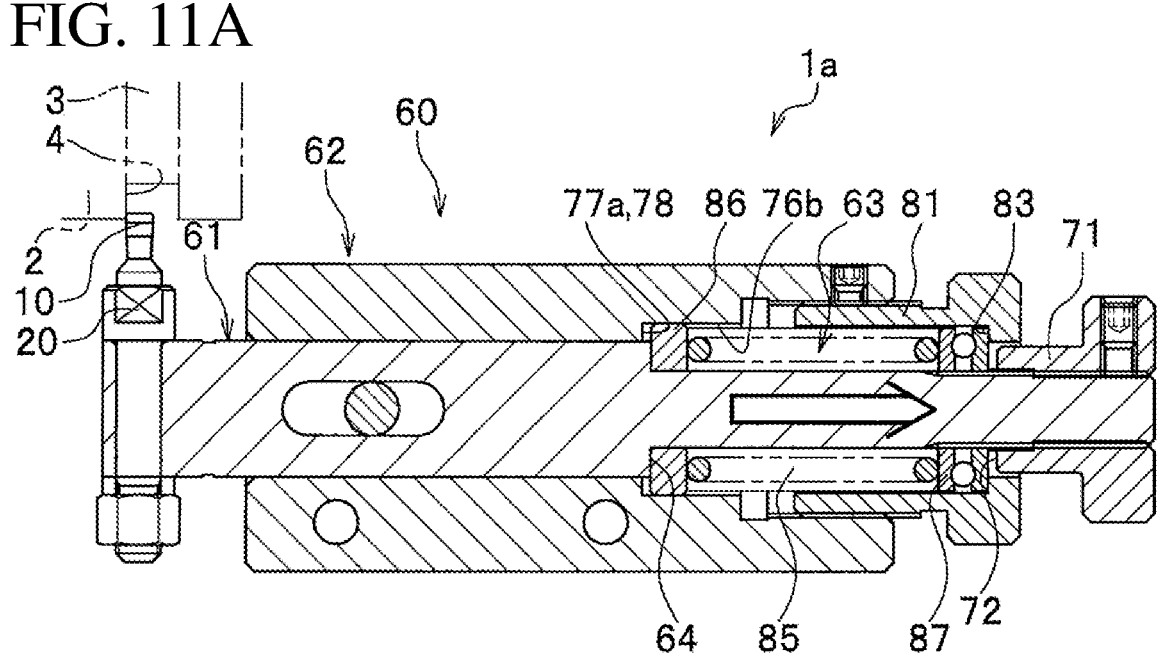
FIG. 11A is a cross-sectional view showing a state in which the piston of the second embodiment has moved during the pushing process.

At the time of pushing, as shown in FIG. 11A, while rotating the workpiece 2, the tip 10 is pressed against the back side surface (the left side surface 4 of the O-ring mounting groove 3 in FIG. 11A) of the surface to be processed. At this time, the tip 10 receives a reaction force, and the piston 61 moves rightward relative to the cylinder portion 62 together with the tip 10 and the tip holder 20. Then, the first pressing surface 64 of the piston 61 pushes the first receiving member 86 on the distal end side of the elastic member 85 to the right side. At this time, since the cylinder portion 62 does not move, the first receiving member 86 is separated from the first support surface 78. On the other hand, since the second receiving member 87 on the proximal end side of the elastic member 85 is pressed by the second support surface 83, the elastic member 85 is compressed to generate an elastic force. The nut member 71 moves rightward together with the piston 61, and the second pressing surface 72 is separated from the second receiving member 87. The generated elastic force is transmitted from the first pressing surface 64 to the piston 61 via the first receiving member 86, and is transmitted to the tip 10 via the tip holder 20. In this way, a suitable pressure is applied to the process face (side surface 4) of the workpiece 2, and the burnishing process can be performed to the desired surface roughness.

Pulling

Figure 11B:
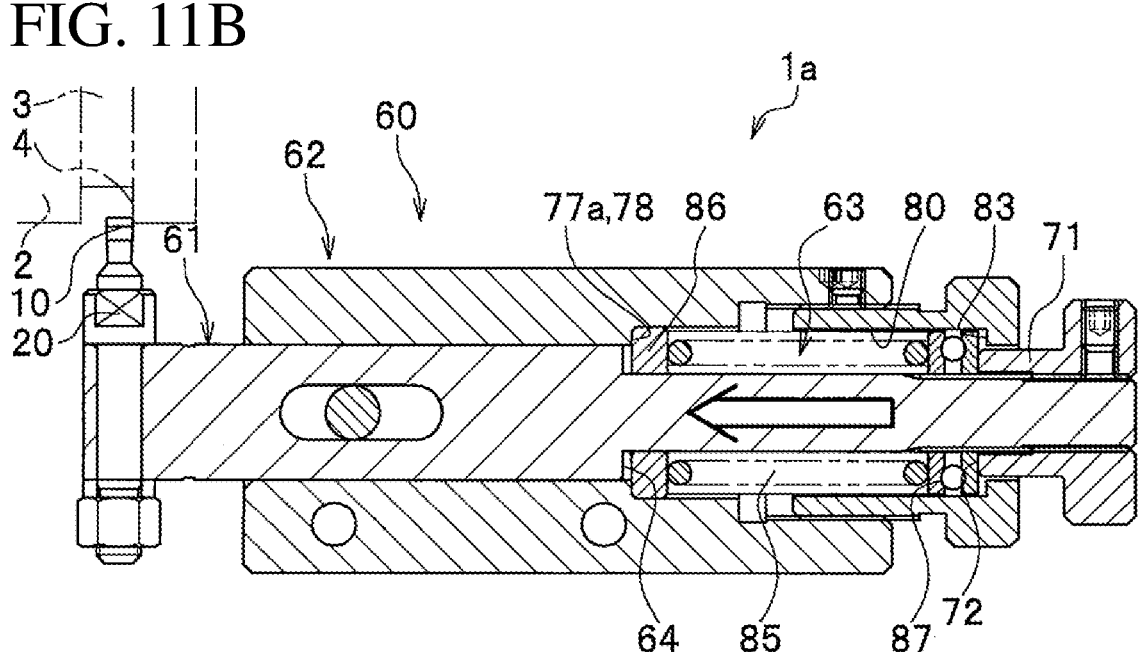
FIG. 11B is a cross-sectional view showing a state in which the piston of the second embodiment has moved during the pulling process.

At the time of pulling, as shown in FIG. 11B, while rotating the workpiece 2, the tip 10 is pulled to the front side surface (the right side surface 4 of the O-ring mounting groove 3 in FIG. 11B) of the surface to be processed. At this time, the tip 10 receives a reaction force, and the piston 61 moves leftward relative to the cylinder portion 62 together with the tip 10 and the tip holder 20. Then, the second pressing surface 72 on the proximal end side of the piston 61 pushes the second receiving member 87 on the proximal end side of the elastic member 85 to the left. At this time, since the cylinder portion 62 does not move, the second receiving member 87 is separated from the second support surface 83. On the other hand, since the first receiving member 86 on the distal end side of the elastic member 85 is pressed by the first support surface 78, the elastic member 85 is compressed to generate an elastic force. The first pressing surface 64 moves leftward together with the piston 61 and is separated from the first receiving member 86. The generated elastic force is transmitted from the second pressing surface 72 to the nut member 71 via the second receiving member 87, and is transmitted to the tip 10 via the piston 61 and the tip holder 20. In this way, a suitable pressure is applied to the process face (side surface 4) of the workpiece 2, and the burnishing process can be performed to the desired surface roughness.

According to the burnishing machine 1a of the present embodiment, the piston 61 can move in both axial directions of the cylinder portion 62, and the pressurizing mechanism 63 can transmit the elastic force of the elastic member 85 in both directions of the piston 61. Therefore, the tip 10 can be urged to the surface to be processed both at the time of pushing and pulling. Therefore, regardless of the pressing direction of the tip 10, the two side surfaces 4 of the O-ring mounting groove 3 can be burnished by a single tool without changing the movement direction of the piston 61.

Although the first and second embodiments of the present invention have been described above, the present invention is not limited to the above-described embodiments, and can be appropriately modified within a range not deviating from the gist thereof. For example, the rolling element 38 and the auxiliary rolling element 40 of the first embodiment are provided within, but are not limited to, the piston 31 and may project outside the piston. In this case, in order to transmit the elastic force in a well-balanced manner, it is preferable that the rolling elements are provided in a symmetrical shape on both sides in the width direction of the piston.

REFERENCE SIGNS LIST

1 Burnishing machine
1a Burnishing machine
2 Workpiece
4 Process face
10 Tip
20 Tip holder
30 Pressurizing unit
31 Piston
32 Cylinder portion
33 Pressurizing mechanism
38 Rolling element
46 Pusher 47 Spring member (elastic member)
51 Spring receiving member
52 Pedestal
53 Load adjusting screw (load adjusting member)
60 Pressurizing unit
61 Piston
62 Cylinder unit
63 Pressurization mechanism
64 First pressing surface
72 Second pressing surface
78 First support surface
83 Second support surface
85 Elastic member
86 First receiving member
87 Second receiving member
130 Pressurizing unit
131 Piston
132 Cylinder portion
133 Pressurizing mechanism
138 Rolling element
146 Pusher

What is claimed is:

1. A burnishing machine, comprising:
a tip configured to press and process a process face; and
a pressurizing unit configured to press the tip against the process face, the pressurizing unit including,
　a piston configured to reciprocate in a direction orthogonal to the tip,
　a cylinder portion that accommodates the piston such that the piston reciprocates; and
　a pressurizing mechanism configured to urge the tip to the process face at both timing of pushing the tip against the process face and pulling the tip against the process face by making the piston reciprocate.

2. The burnishing machine according to claim 1, wherein the pressurizing mechanism pressurize the piston by elastic force in accordance with an amount of displacement of the piston from a reference position.

3. The burnishing machine according to claim 2, wherein the tip includes,
　a parallel portion located at a distal end of the tip, the parallel portion having an outer peripheral surface that is parallel to the process face; and
　a tapered portion located at base end side of the parallel portion, the tapered portion having a decreasing diameter toward a base end of the tip.

4. The burnishing machine according to claim 2, wherein the pressurizing mechanism includes,
　a rolling element rotatable about an axis orthogonal to an axial direction of the piston, the rolling element arranged in the piston,
　a pusher movable in a direction orthogonal to the axial direction of the piston and an axial direction of the rolling element,
　an elastic member configured to urge the pusher to the rolling element, and
　a cam surface located at a distal end of the pusher, the cam surface configured to abut the rolling element,
wherein when the piston is at a reference position, a height of the cam surface with respect to the rolling element reaches a maximum point, and the height of the cam surface with respect to the rolling element gradually decreases as the piston reciprocates.

5. The burnishing machine according to claim 2, wherein the pressurizing mechanism includes,
　a pusher movable in a direction orthogonal to the axial direction of the piston,
　a rolling element rotatable about an axis orthogonal to an axial direction of the piston, the rolling element arranged at a distal end of the pusher,
　an elastic member configured to urge the pusher to the rolling element, and
　a cam surface located at an outer peripheral surface of the piston, the cam surface configured to abut the rolling element,
wherein when the piston is at a reference position, a height of the cam surface with respect to the rolling element reaches a minimum point, and the height of the cam surface with respect to the rolling element gradually increases as the piston reciprocates.

6. The burnishing machine according to claim 2, wherein the pressurizing mechanism includes an elastic member along the axial direction of the piston,
the cylinder portion includes,
　a first support surface configured to abut against distal end of the elastic member via a first receiving member, and
　a second support surface configured to abut against base end of the elastic member via a second receiving member,
the piston includes,
　a first pressing surface configured to abut against distal end of the elastic member via the first receiving member, and
　a second pressing surface configured to abut against base end of the elastic member via the second receiving member.

7. The burnishing machine according to claim 2, further comprising:
a tip holder configured to rotatably support the tip.

8. The burnishing machine according to claim 1, wherein the tip includes,
　a parallel portion located at a distal end of the tip, the parallel portion having an outer peripheral surface that is parallel to the process face; and
　a tapered portion located at base end side of the parallel portion, the tapered portion having a decreasing diameter toward a base end of the tip.

9. The burnishing machine according to claim 8, wherein the pressurizing mechanism includes,
　a rolling element rotatable about an axis orthogonal to an axial direction of the piston, the rolling element arranged in the piston,
　a pusher movable in a direction orthogonal to the axial direction of the piston and an axial direction of the rolling element,
　an elastic member configured to urge the pusher to the rolling element, and
　a cam surface located at a distal end of the pusher, the cam surface configured to abut the rolling element,
wherein when the piston is at a reference position, a height of the cam surface with respect to the rolling element reaches a maximum point, and the height of the cam surface with respect to the rolling element gradually decreases as the piston reciprocates.

10. The burnishing machine according to claim 8, wherein the pressurizing mechanism includes,
　a pusher movable in a direction orthogonal to the axial direction of the piston,
　a rolling element rotatable about an axis orthogonal to an axial direction of the piston, the rolling element arranged at a distal end of the pusher,
　an elastic member configured to urge the pusher to the rolling element, and a cam surface located at an outer peripheral surface of the piston, the cam surface configured to abut the rolling element, wherein when the piston is at a reference position, a height of the cam surface with respect to the rolling element reaches a minimum point, and the height of the cam surface with respect to the rolling element gradually increases as the piston reciprocates.

11. The burnishing machine according to claim 8, further comprising:
a tip holder configured to rotatably support the tip.

12. The burnishing machine according to claim 1, wherein the pressurizing mechanism includes,
a rolling element rotatable about an axis orthogonal to an axial direction of the piston, the rolling element arranged in the piston,
a pusher movable in a direction orthogonal to the axial direction of the piston and an axial direction of the rolling element,
an elastic member configured to urge the pusher to the rolling element, and
a cam surface located at a distal end of the pusher, the cam surface configured to abut the rolling element,
wherein when the piston is at a reference position, a height of the cam surface with respect to the rolling element reaches a maximum point, and the height of the cam surface with respect to the rolling element gradually decreases as the piston reciprocates.

13. The burnishing machine according to claim 12, wherein
the pressurizing mechanism further includes a load adjusting member configured to move a pedestal supporting one end of the elastic member in an axial direction of the pressurizing mechanism.

14. The burnishing machine according to claim 13, further comprising:
a tip holder configured to rotatably support the tip.

15. The burnishing machine according to claim 12, further comprising:
a tip holder configured to rotatably support the tip.

16. The burnishing machine according to claim 1, wherein the pressurizing mechanism includes,
a pusher movable in a direction orthogonal to the axial direction of the piston,
a rolling element rotatable about an axis orthogonal to an axial direction of the piston, the rolling element arranged at a distal end of the pusher,
an elastic member configured to urge the pusher to the rolling element, and
a cam surface located at an outer peripheral surface of the piston, the cam surface configured to abut the rolling element,
wherein when the piston is at a reference position, a height of the cam surface with respect to the rolling element reaches a minimum point, and the height of the cam surface with respect to the rolling element gradually increases as the piston reciprocates.

17. The burnishing machine according to claim 16, wherein
the pressurizing mechanism further includes a load adjusting member configured to move a pedestal supporting one end of the elastic member in an axial direction of the pressurizing mechanism.

18. The burnishing machine according to claim 16, further comprising:
a tip holder configured to rotatably support the tip.

19. The burnishing machine according to claim 1, wherein the pressurizing mechanism includes an elastic member along the axial direction of the piston,
the cylinder portion includes,
a first support surface configured to abut against distal end of the elastic member via a first receiving member, and
a second support surface configured to abut against base end of the elastic member via a second receiving member,
the piston includes,
a first pressing surface configured to abut against distal end of the elastic member via the first receiving member, and
a second pressing surface configured to abut against base end of the elastic member via the second receiving member.

20. The burnishing machine according to claim 1, further comprising:
a tip holder configured to rotatably support the tip.

* * * * *